(12) United States Patent
Archibald et al.

(10) Patent No.: US 11,876,456 B2
(45) Date of Patent: Jan. 16, 2024

(54) SWITCHING REGULATOR IMPLEMENTING POWER RECYCLING

(71) Applicant: Alpha and Omega Semiconductor International LP, Toronto (CA)

(72) Inventors: Nicholas I. Archibald, San Francisco, CA (US); Steven P. Laur, Raleigh, NC (US); Rhys S. A. Philbrick, Los Gatos, CA (US)

(73) Assignee: Alpha and Omega Semiconductor International LP, Toronto (CA)

( * ) Notice: Subject to any disclaimer, the term of this patent is extended or adjusted under 35 U.S.C. 154(b) by 18 days.

(21) Appl. No.: 17/698,837

(22) Filed: Mar. 18, 2022

(65) Prior Publication Data
US 2023/0179099 A1 Jun. 8, 2023

Related U.S. Application Data

(60) Provisional application No. 63/287,525, filed on Dec. 8, 2021.

(51) Int. Cl.
*H02M 3/158* (2006.01)
*H02M 1/00* (2006.01)
*H02M 1/36* (2007.01)

(52) U.S. Cl.
CPC ........ *H02M 3/1588* (2013.01); *H02M 1/0048* (2021.05); *H02M 1/36* (2013.01)

(58) Field of Classification Search
CPC .......................................... H02M 3/155–1588
See application file for complete search history.

(56) References Cited

U.S. PATENT DOCUMENTS

| | | | |
|---|---|---|---|
| 10,128,757 B2 | 11/2018 | Unno | |
| 2006/0071651 A1* | 4/2006 | Ito | H02M 3/1588 323/351 |
| 2010/0133912 A1* | 6/2010 | King | H02M 3/1582 307/82 |
| 2010/0320839 A1* | 12/2010 | Walter | H02M 3/1588 307/43 |

* cited by examiner

*Primary Examiner* — Peter M Novak (57) ABSTRACT

A controller for a switching regulator receiving an input voltage and generating a regulated output voltage includes a buck control circuit and a boost control circuit. The controller activates the buck control circuit to generate the regulated output voltage having a first voltage value less than the input voltage. The controller activates the boost control circuit to return charges stored on the output capacitor at the output node to the input node, thereby driving the regulated output voltage to a second voltage value lower than the first voltage value. In some embodiments, in response to a command instructing the controller to allow the output voltage to decay, the controller operates in the boost mode using the boost control circuit to recycle the stored charge at the output node while ramping down the output voltage.

27 Claims, 6 Drawing Sheets

SWITCHING REGULATOR IMPLEMENTING POWER RECYCLING

CROSS REFERENCE TO RELATED APPLICATIONS

This application claims priority to U.S. Provisional Patent Application No. 63/287,525, entitled SWITCHING REGULATOR IMPLEMENTING POWER RECYCLING, filed Dec. 8, 2021, which application is incorporated herein by reference for all purposes.

FIELD OF THE INVENTION

The invention relates to switching regulator circuits and methods and, in particular, to a switching regulator implementing power recycling.

BACKGROUND OF THE INVENTION

Electronic systems, such as laptop computers, typically include power management integrated circuits for regulating the power usage of the electronic systems. Furthermore, electronic systems incorporating integrated circuits typically employ voltage regulators to convert a main bus voltage from a power source supplying the system to one or more voltages necessary for driving the integrated circuits therein. For example, a 5 volts supply voltage provided to an electronic system may need to be reduced to 1.8 volts to drive an integrated circuit in the electronic system. Portable computing devices, such as laptop or notebook computers, include processors (or microcontrollers) and local memory coupled to components and executing embedded software to perform certain tasks. In practice, the processor power supply is provided by a voltage regulator converting an input voltage from a power source to a voltage value specified for the processor.

Switch mode power supplies or switching regulators, also referred to as DC to DC converters, are a type of voltage regulators often used to convert an input supply voltage to a desired output voltage at a voltage level selected for an integrated circuit. In one example, a 12V or 5V supply voltage may be reduced to 1V or 0.9V for supplying an embedded processor. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

Some switching regulators employ pulse width modulation (PWM) to control the duty cycle of the power switches. That is, the on-time of the power switches may be controlled at a given fixed or variable frequency by adjusting the pulse width. Switching regulators employing PWM control include a PWM controller or modulator to drive a power block including the power switches, the driver circuit for the power switches and the LC filter circuit. In some cases, the switching regulator is a single phase converter and the PWM controller generates a single phase PWM signal to drive a single phase power block. In other cases, the switching regulator is a multi-phase converter and a multi-phase PWM controller generates switching signals with different phase shifts to drive a multi-phase power block, each PWM signal driving a respective power block cell. Multi-phase PWM controllers are desirable when the voltage regulator has to deliver high levels of power in a low profile solution or when a high conversion efficiency needs to be maintained over a wide range of load conditions.

In some applications, the host system commands a specific voltage value for the switching regulator output voltage (e.g. 1V) for driving an integrated circuit, such as a processor. The host system may further command the switching regulator to ramp down the output voltage when the processor is not in use. When commanded to ramp down, there are cases when the switching regulator is directed to stop the switching of the power switches and allow the output voltage to self discharge or decay, typically to 0V.

BRIEF DESCRIPTION OF THE DRAWINGS

Various embodiments of the invention are disclosed in the following detailed description and the accompanying drawings.

DETAILED DESCRIPTION

According to embodiments of the present invention, a controller for a switching regulator receiving an input voltage and generating a regulated output voltage includes a buck control circuit and a boost control circuit. The controller activates the buck control circuit to generate the regulated output voltage having a first voltage value less than the input voltage. The controller activates the boost control circuit to return charges stored on the output capacitor at the output node to the input node, thereby driving the regulated output voltage to a second voltage value lower than the first voltage value. In some embodiments, the controller operates in the buck mode using the buck control circuit in normal operation to generate the regulated output voltage. In response to a command instructing the controller to allow the output voltage to decay, the controller operates in the boost mode using the boost control circuit to recycle the stored charge at the output node while allowing the output voltage to ramp down more rapidly due to the active relocation of the stored charge.

A salient feature of the switching regulator of the present invention is that the controller can operate in boost mode to recycle charges that would otherwise be lost to leakage current at the load. In conventional switching regulators, when commanded to allow the output voltage to self-discharge or decay, the controller will merely stop switching the power switches and the stored charges at the output node will be dissipated eventually by leakage paths at the load. To the contrary, the switching regulator of the present invention actively controls the output voltage ramp down process by recycling the stored charges on the output node back to the input node. The recycled charge may be used to increase battery life and in general improve the energy efficiency of the electronic system incorporating the switching regulator.

Figure 1:
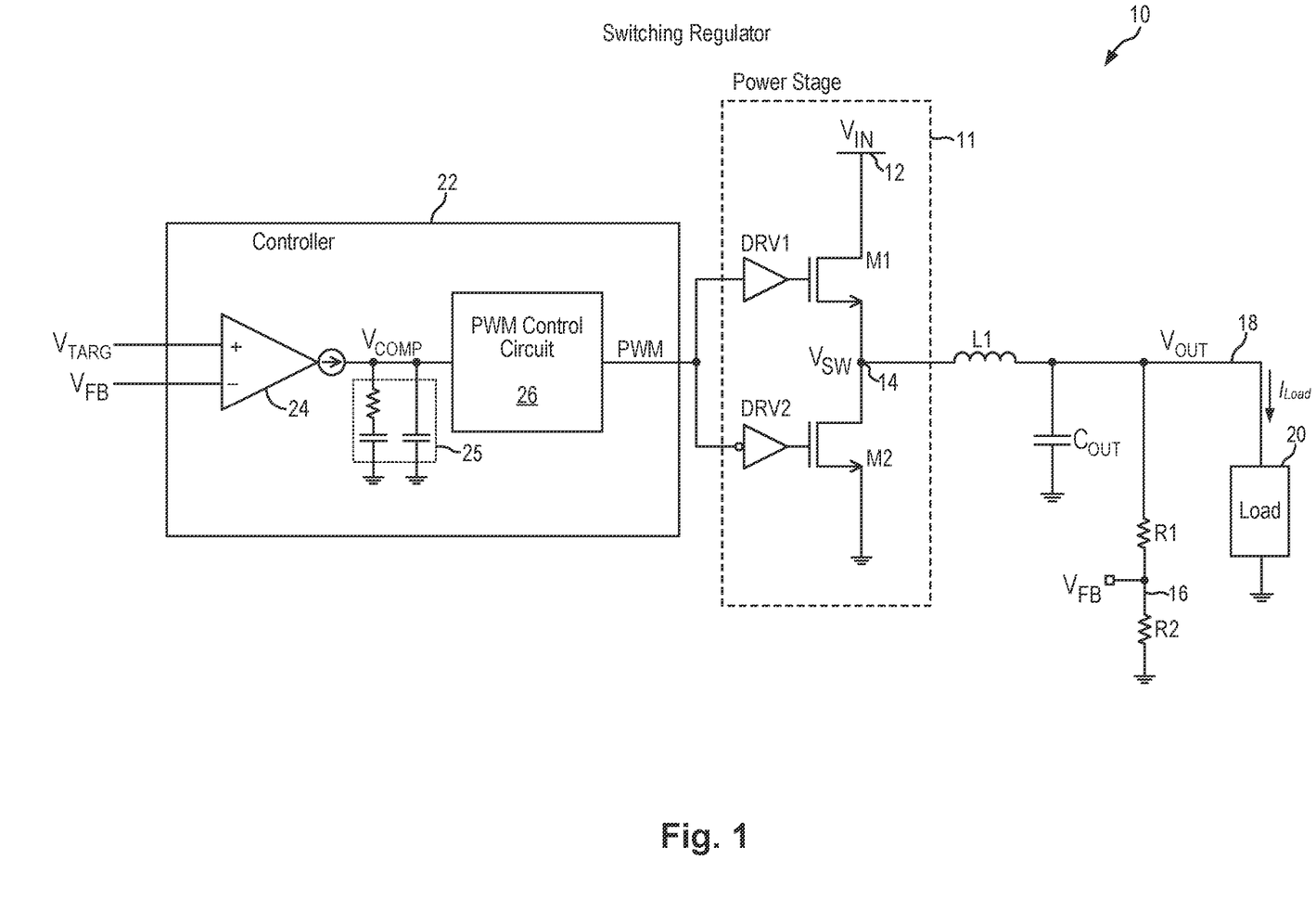
FIG. 1 is a schematic diagram of a switching regulator in some examples.

FIG. 1 is a schematic diagram of a switching regulator in some examples. In particular, the switching regulator of FIG. 1 employs pulse width modulation (PWM) to control the duty cycle of the power switches. That is, the on-time of power switches may be controlled at a given fixed or variable frequency by adjusting the pulse width. Switching regulators employing PWM control include a PWM controller or PWM modulator to drive a power block including the power switches, the driver circuit for the power switches and the LC filter circuit. Referring to FIG. 1, a switching regulator 10 includes a controller 22 coupled to drive a power block including a power stage 11 with associated output inductor L1 and an output capacitor $C_{OUT}$. More specifically, the switching regulator 10 receives an input voltage $V_{IN}$ on an input node 12 and generates a regulated output voltage $V_{OUT}$ on an output node 18 to supply a load 20. The controller 22 provides a PWM signal to drive the power stage 11. The power stage 11 includes a pair of serially connected power switches M1, M2 which are turned on and off alternately by the PWM signal to regulate the output voltage $V_{OUT}$ with reference to a target voltage $V_{TARG}$ (also referred to as a reference voltage). In particular, the power switches M1 and M2 in the power stage 11 are alternately turned on and off to generate a switching output voltage $V_{SW}$ at a switching output node 14. The output inductor L1 is coupled between the switching output node 14 of the power stage 11 and the output capacitor $C_{OUT}$ (node 18). The output inductor L1 and the output capacitor $C_{OUT}$ form an LC circuit for providing current to the output node 18 while maintaining a substantially constant output voltage $V_{OUT}$. The output voltage $V_{OUT}$ can then be used to drive the load 20.

The switching regulator 10 implements a feedback control loop to regulate the output voltage $V_{OUT}$. To that end, the controller 22 receives a feedback voltage $V_{FB}$ indicative of the regulated output voltage $V_{OUT}$ either at the output node 18 or at the load 20. In some examples, the feedback voltage $V_{FB}$ is a stepped down voltage of the output voltage $V_{OUT}$. For example, the feedback voltage $V_{FB}$ may be generated by a voltage divider including resistors R1 and R2 and the common node 16 provides the divided down output voltage as the feedback voltage $V_{FB}$. The controller 22 also receives a reference voltage or target voltage $V_{TARG}$ indicative of the voltage value desired for the regulated output voltage or feedback point. In some examples, the target voltage may be indicated by a voltage identification code signaling the desired regulator output voltage. For instance, in some applications, the system implements voltage positioning where the target voltage shifts with the load, that is, Vout target=Vout requested−R*Load, where R is a fixed value. When implementing voltage positioning, the controller 22 may receive a voltage identification (VID) code that tells the modulator what output voltage it should provide. Each VID code is associated with a voltage value. A decoder (not shown) decodes the code to generate the target voltage, with the true target often further adjusted based on the real-time load to give an emulated output impedance.

The controller 22 includes circuitry to implement the feedback control loop of the switching regulator to generate the PWM signal to drive the power stages 11. In particular, the controller 22 includes an error amplifier 24 coupled to compare the feedback voltage $V_{FB}$ to the target voltage $V_{TARG}$ to generate a compensated control loop error signal $V_{COMP}$. The error signal $V_{COMP}$ can be a voltage signal or a current signal. For example, the error amplifier 24 generates an output current which can be converted to a voltage signal by a loop filter 25 coupled to the output of the error amplifier 24. The error signal $V_{COMP}$ is provided to a PWM control circuit 26, which may include circuitry such as a modulating comparator and a latch circuit to generate the PWM signal. The PWM signal is coupled to the driver circuits DRV1 and DRV2 to drive the respective power switches M1 and M2. In one example, the PWM signal is inverted at the driver circuit DRV2 for driving the lower power switch M2. In this manner, the upper power switch M1 and the lower power switch M2 are turned on and off alternately by the PWM signal.

In the present example, the switching regulator 10 is configured as a buck regulator to step down the input voltage $V_{IN}$ to generate an output voltage $V_{OUT}$ having a lower voltage value than the input voltage. The controller 22 generates the PWM signal having an up-ramp portion and a down-ramp portion. The up-ramp portion of the PWM signal turns on the upper power switch M1 to cause a phase current to flow from the input voltage node 12 to the inductor L1. The inductor L1 stores the charge from the phase current. The down-ramp portion of the PWM signal turns on the lower power switch M2 which delivers the stored charge in the inductor L1 to the output capacitor $C_{OUT}$. The switching output voltage $V_{SW}$ switches between the input voltage $V_{IN}$ and the ground potential and the LC filter circuit formed by the inductor L1 and the output capacitor $C_{OUT}$ generates a regulated output voltage having a substantially constant magnitude.

Figure 2:
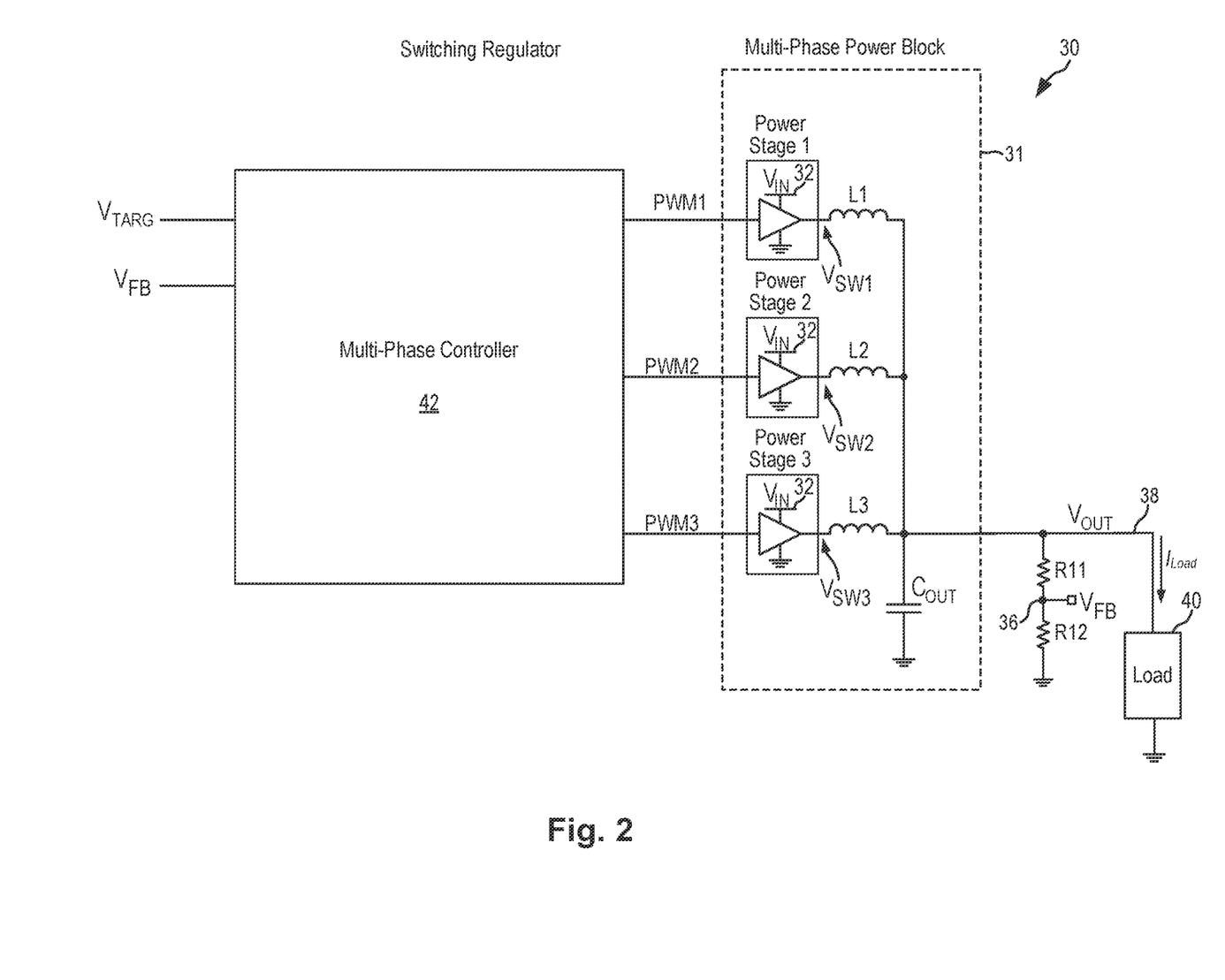
FIG. 2 is a schematic diagram of a multi-phase switching regulator in some examples.

The switching regulator 10 in FIG. 1 illustrates a single phase voltage regulator. In other examples, the switching regulator may be implemented as a multi-phase voltage regulator. FIG. 2 is a schematic diagram of a multi-phase switching regulator in some examples. Referring to FIG. 2, a multi-phase switching regulator 30 includes a multi-phase controller 42 generating a set of PWM signals for driving a multi-phase power block 31. In the present example, the multi-phase power block 31 includes three power stages 1-3 with respective associated output inductors L1 to L3 connected between the respective switching output node ($V_{SW1}$-$V_{SW3}$) and an output capacitor $C_{OUT}$ which is connected to the output node 38 to provide the output voltage $V_{OUT}$. The output voltage $V_{OUT}$ can then be used to drive the load 40.

The multi-phase controller 42 receives the feedback voltage $V_{FB}$ and the reference voltage $V_{TARG}$ and generates a set of PWM signals PWM1, PWM2, PWM3 having different phases to drive the respective power stages 1, 2 and 3. The multi-phase controller 42 enables the switching regulator 30 to deliver a regulated output voltage with high precision over a wide range of load conditions.

The power recycling circuit and method of the present invention can be applied to a single phase switching regulator, such as the switching regulator 10 of FIG. 1, or a multi-phase switching regulator, such as the switching regulator 30 of FIG. 2. A single phase switching regulator includes a single-phase PWM modulator or controller which generates a single phase PWM signal to drive a single phase power block. A multi-phase switching regulator includes a multi-phase PWM modulator or controller which generates PWM signals with different phase shifts to drive a multi-phase power block, each PWM signal driving a respective power stage in the power block. The power recycling circuit and method of the present invention can be incorporated in single-phase regulators or multi-phase regulators to recycle charges from the output node to the input node. The specific configuration of the switching regulator is not critical to the practice of the present invention. For ease of discussion, the following description refers to a single phase switching regulator.

Figure 3:
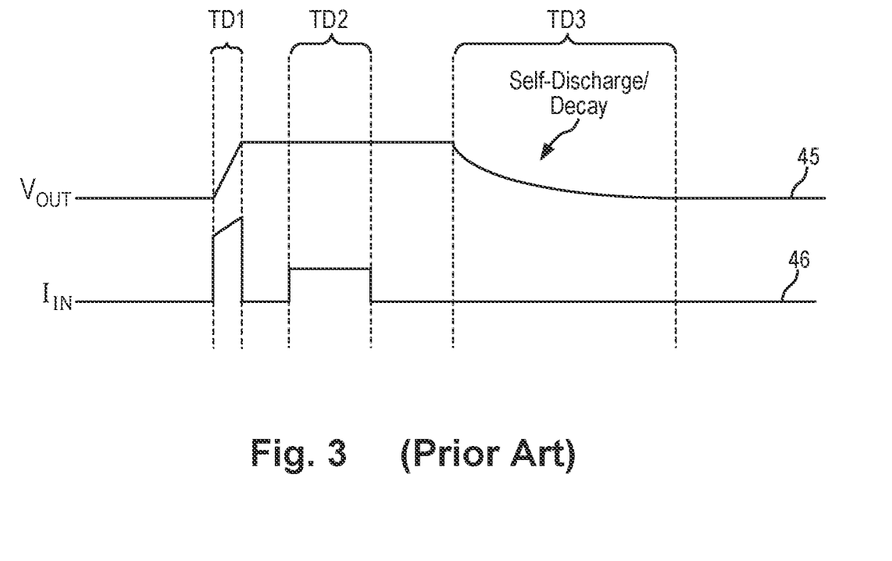
FIG. 3 illustrates output voltage and input current waveforms for a switching regulator in some examples.

In some applications, an electronic system may employ a switching regulator to generate a cycled output voltage. For instance, switching regulators are commonly employed in electronic systems to supply power to processors, or microprocessors, or CPU or GPU. The switching regulator may receive an input voltage of 12V and may step down or buck the input voltage to a regulated output voltage of 0.9 V to power a processor integrated circuit. The system may command the switching regulator to generate the targeted output voltage when the processor is in use and then allow the output voltage to self-discharge or decay away when the processor is not in use. FIG. 3 illustrates output voltage and input current waveforms for a switching regulator in some examples. Referring to FIG. 3, the output voltage $V_{OUT}$ (curve 45) is ramped up to the targeted voltage during time duration TD1. Input current (curve 46) is drawn from the input voltage. During the period when the output voltage $V_{OUT}$ is being regulated to the targeted voltage, the switching regulator regulates the output voltage $V_{OUT}$ by switching the upper and lower power switches on and off alternately. Accordingly, the upper power switch is turned on periodically and out of phase with the lower switch to source the appropriate amount of current from the input voltage to supply the load, which in turn can vary, such as during the time duration TD2. At some point in time, the output voltage is no longer needed and the switching regulator ceases switching the power switches and the output voltage $V_{OUT}$ ramps down or decreases, such as during time duration TD3.

During the course of operation of the electronic system, the output voltage $V_{OUT}$ may be repeatedly cycled from a low voltage state (e.g. 0V) to a high voltage state (e.g. 0.9V) to drive a load and then allowed to decay when the load is not in use. In conventional switching regulators, the self-discharge or decay of the output voltage is realized by the controller ceasing switching of the power switches and letting any stored charge at with the output voltage to dissipate to ground, such as through leakage current in the load. The output voltage will then decay or decrease to the ground voltage. In practice, the output voltage of the switching regulator may be repeatedly cycled—that is ramped up and then dissipated down—many times over the course of the operation. Each time the output voltage is ramped down, any residual energy at the output node is dissipated to ground and wasted.

Figure 4:
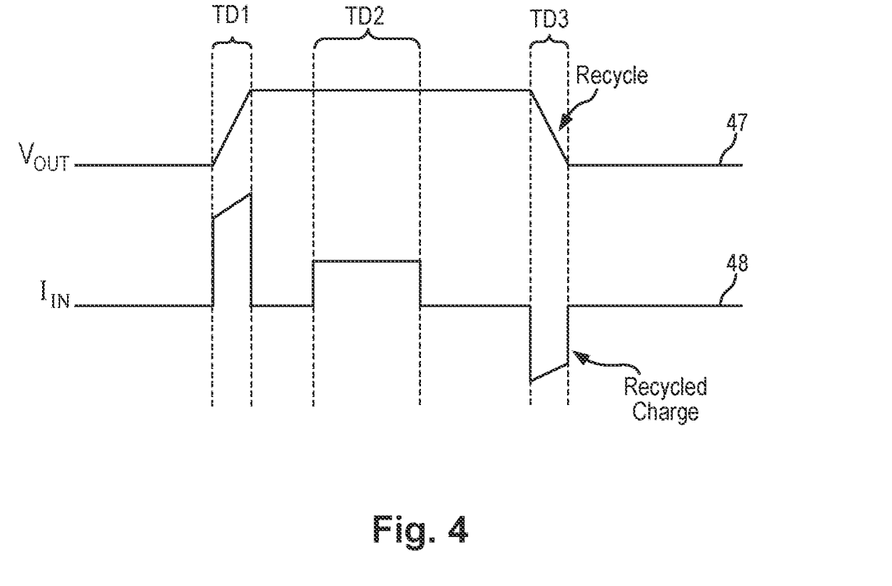
FIG. 4 illustrates output voltage and input current waveforms for a switching regulator in embodiments of the present invention.

In embodiments of the present invention, a power recycle circuit and method is implemented in a switching regulator to return charges, which may otherwise be dissipated to ground when the output voltage is ramped down, back to the input voltage node. In this manner, unused energy is recycled and the output voltage is ramped down more quickly as compared to the self-discharge process based on the leakage current alone. FIG. 4 illustrates output voltage and input current waveforms for a switching regulator in embodiments of the present invention. Referring to FIG. 4, the output voltage $V_{OUT}$ (curve 47) is ramped up to the targeted voltage during time duration TD1. Input current (curve 48) is drawn from the input voltage. During the period when the output voltage $V_{OUT}$ is being regulated to the targeted voltage, the switching regulator regulates the output voltage $V_{OUT}$ by switching the upper and lower power switches on and off alternately. The upper power switch is turned on periodically and out of phase with the lower switch to source the appropriate amount of current from the input voltage to supply the load, which in turn can vary, such as during the time duration TD2. At some point in time, the output voltage is no longer needed, such as during time duration TD3. In that case, the switching regulator activates power recycling where the output voltage is ramped down by returning the charge at the output node to the input voltage node. In FIG. 4, the negative-going current pulse on the input current $I_{IN}$ indicates charge being returned or recycled to the input voltage node.

When the switching regulator implements the power recycling circuit and method of the present invention, the switching regulator can enable overall power saving by recycling energy that would otherwise be lost when the output voltage is ramped down. In switching regulators with large output capacitors, the amount of recycled energy can be a significant portion of the total input energy. Switching regulators incorporating the power recycling circuit and method of the present invention realizes significant advantages over conventional switching regulators by improving energy usage. In particular, when the input voltage is supplied by a battery, the switching regulator with power recycling can improve or prolong battery life.

Figure 5:
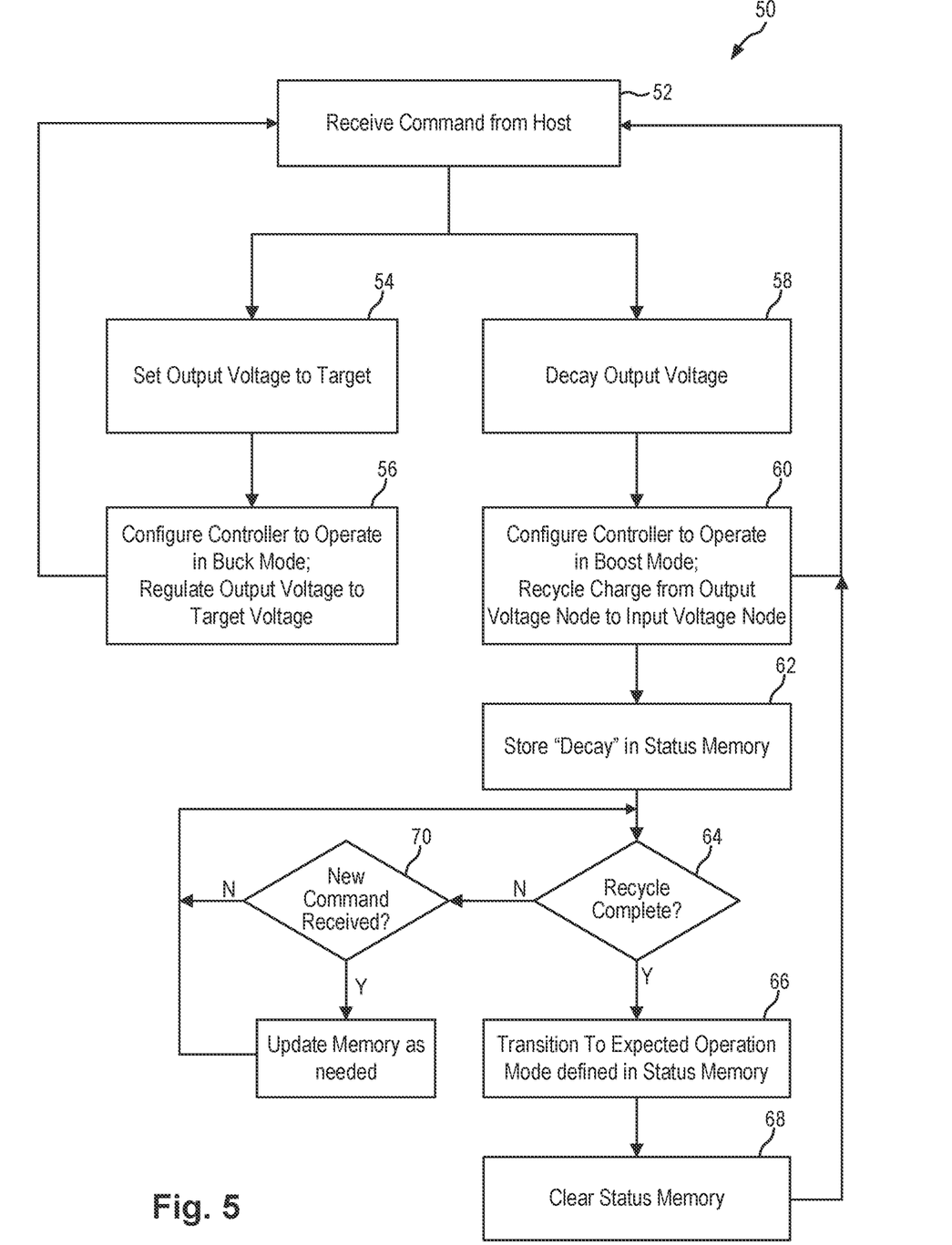
FIG. 5 is a flow chart illustrating a power recycle method which can be implemented in a switching regulator in embodiments of the present invention.

FIG. 5 is a flow chart illustrating a power recycle method which can be implemented in a switching regulator in embodiments of the present invention. In some examples, the power recycle method can be implemented in a single phase switching regulator or a multi-phase switching regulator, such as the switching regulators shown in FIGS. 1 and 2. Referring to FIG. 5, a power recycle method 50 implemented in a switching regulator is initiated when a command is received from the host (52). In the present description, the host refers to the electronic system in which the switching regulator is incorporated. The command may be a normal operation command instructing the switching regulator to set the output voltage to a target voltage (54). In that case, the power recycle method 50 configures the controller of the switching regulator to operate in the buck mode to step down the input voltage to generate the output voltage (56). The controller operates in the buck mode to regulate the output voltage to the target voltage. In practice, the buck mode is the main mode of operation for the switching regulator. The regulated output voltage is used to supply a load, such as a processor. The power recycle method 50 continues to receive commands from the host (52).

In another scenario, the command received from the host is a decay command instructing the switching regulator to ramp down the output voltage (58). In that case, the power recycle method 50 configures the controller of the switching regulator to operate in the boost mode to recycle charge from the output voltage node to the input voltage node (60). Meanwhile, the power recycle method 50 continues to receive commands from the host (52).

More specifically, the decay command instructs the switching regulator to enter the decay mode whereby the switching regulator stops switching the power switches (i.e. stop turning the power switches on and off) and allows the output voltage on the output voltage node to decay or decrease down to a predetermined voltage value, such as 0V. When the switching regulator stops switching, the output voltage is not being supplied from the input voltage and the output voltage will decrease over time, typically through leakage current at the load, as shown in FIG. 3. The charge stored at the output voltage node, typically stored on the output capacitor, will dissipate to ground through leakage paths in the load. The ramp down of the output voltage may take a long time duration.

In embodiments of the present invention, the power recycle method 50 does not self-discharge or decay the output voltage per the decay command. Rather, the power recycle method 50 configures the controller to operate in the boost mode so that the switching regulator actively relocate the charge stored at the output voltage node. That is, the power recycle method 50 actively recycles the charge stored at the output voltage node, such as on the output capacitor. The stored charge does not simply dissipate to ground but is actively recycled from the output voltage node to the input voltage node. In the case the input voltage source is a battery power source, the recycle charge has the effect of replenishing the battery power and therefore increasing the battery power life.

In certain applications, when the host issues the decay command to the switching regulator, the switching regulator may have various reporting requirements during the period the switching regulator is in the decay mode to decay or self-discharge the output voltage (sometimes referred to as the "decay period"), or the switching regulator may need to respond to interim commands differently based on whether it is or is not in the decay period. The switching regulator implementing the power recycle method of the present invention will need to provide appropriate response to such reporting requirements or commands, so as not to confuse the host system. That is, when the host system commands a decay operation, the switching regulator needs to report that it is in decay status or behave as if it is in decay mode even though it is actually performing charge recycling. For examples, the host system may issue a command to change the switching regulator's switching mode. This command would be ignored by the switching regulator if the switching regulator is in the decay mode but the command would be executed otherwise. In another example, the commands can also influence the operation mode required for the switching regulator at the end of the ramp down period, and as such the switching regulator needs to remember the command so as to know what mode to go into at the end of the output voltage ramp down.

In embodiments of the present invention, the power recycle method 50 implements status reporting and command response to ensure the switching regulator provides correct status indicator meeting the reporting requirements and command responses of the host system. In particular, the charge recycling operation in the power recycle method 50 is performed clandestinely, that is, without knowledge by the host. Therefore, the power recycle method 50 will provide status report as if the switching regulator is performing the decay command issued by the host, will respond to further commands received during the power recycle period as if it is in a decay mode, and will exit from the hidden mode to the correct condition. In other words, when the power recycle method 50 is being implemented and the decay command is received, the switching regulator is operated in the boost mode to perform charge recycling, but the switching regulator will report to the host that it is decaying or self-discharging the output voltage. Similarly, if a command is received during the period where the switching regulator is supposed to be decaying the output voltage but is actually clandestinely recycling, the switching regulator maintains a memory of the received command to know what should happen at the end of the decay period, and the switching regulator can then exit the recycle mode into the correct state.

Referring still to FIG. 5, in one embodiment, the power recycle method 50 stores a decay status indicator in a status memory (62). The stored status indicator in the status memory will be used for any reporting or response functions. The decay status indicator is stored while the charge recycling is in progress (64). When the charge recycling is completed, the power recycle method 50 will place the switching regulator in an expected operating mode for exit from the decay command so that the switching regulator will be in a state consistent with having performed the decay command (66). The power recycle method 50 also clears the status memory (68). The switching regulator essentially sits idle pending further commands from the host system (52). In this manner, the power recycle method ensures that the switching regulator will report the decay status indicator when queried even while the switching regulator is recycling charges and the power recycle method further ensures that the switching regulator is placed in the expected operating mode after charge recycling.

It is instructive to note that the stored status indicator in the status memory can also be used to respond to incoming commands or requests during the power recycle period. Referring to FIG. 5, the switching regulator may receive another command while performing charge recycling (70). The power recycle method 50 stores the received command in the status memory (72). Accordingly, the switching regulator can respond to the incoming command as if it is in the decay state by using the commands stored in the status memory. In this manner, the switching regulator provides expected responses to the host to ensure seamless operation.

As described above, in the course of the operation of the switching regulator, the host may command the switching regulator to ramp up the output voltage to the target voltage and to decay the output voltage repeatedly over many cycles. By recycling the charge each time the output voltage is commanded to self-discharge or decay, the system can recover a large amount of energy that would otherwise be lost when the output voltage is merely allowed to dissipate to ground. The recovered energy can be significant when the output capacitor $C_{OUT}$ has a large capacitance.

Figure 6:
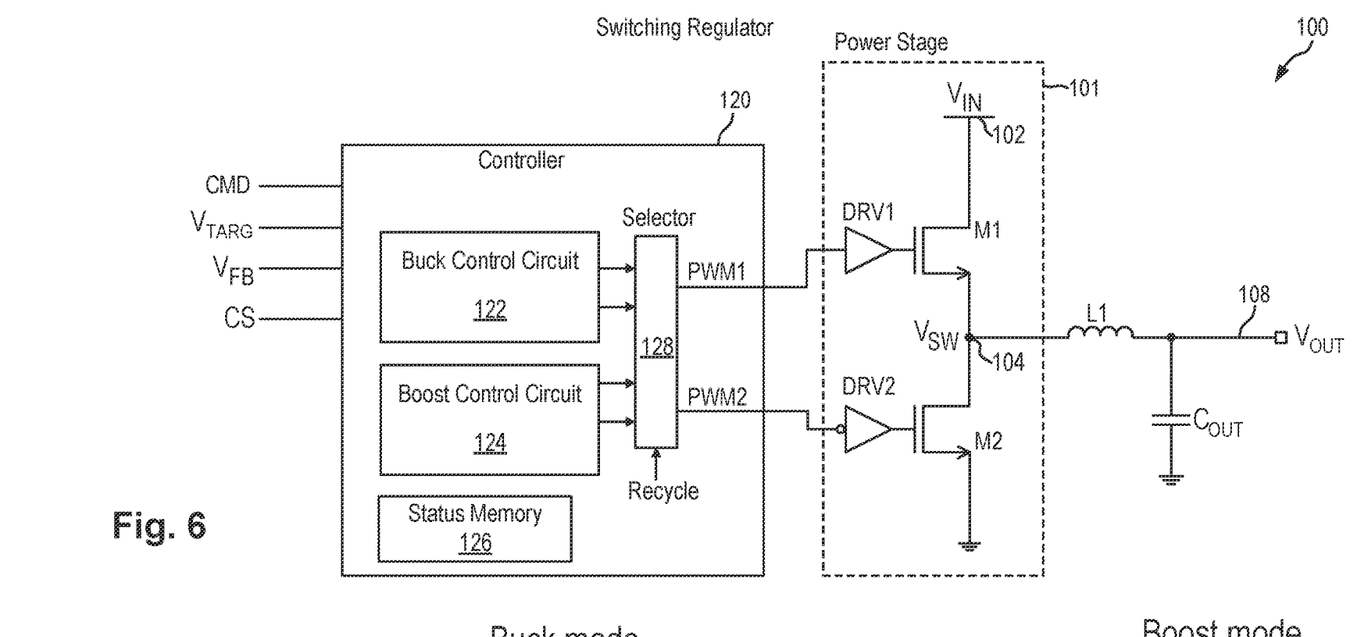
FIG. 6 is a schematic diagram of a switching regulator incorporating power recycling in embodiments of the present invention.

FIG. 6 is a schematic diagram of a switching regulator incorporating power recycling in embodiments of the present invention. Referring to FIG. 6, a switching regulator 100 includes a controller 120 coupled to drive a power block including a power stage 101 with associated output inductor L1 and an output capacitor $C_{OUT}$. More specifically, the switching regulator 100 receives an input voltage $V_{IN}$ on an input node 102 and generates a regulated output voltage $V_{OUT}$ on an output node 108 to supply a load (not shown). The controller 120 provides a PWM signal to drive the power stage 101. The power stage 101 includes a pair of serially connected power switches M1, M2 which are turned on and off alternately by the PWM signal to regulate the output voltage $V_{OUT}$ with reference to a target voltage $V_{TARG}$ (also referred to as a reference voltage). In particular, the power switches M1 and M2 in the power stage 101 are alternately turned on and off to generate a switching output voltage $V_{SW}$ at a switching output node 104. The output inductor L1 is coupled to the switching output node 104 of the power stage 101 and the output capacitor $C_{OUT}$ (node 108). The output inductor L1 and the output capacitor $C_{OUT}$ form an LC circuit for providing current to the output node 108 while maintaining a substantially constant output voltage $V_{OUT}$. The output voltage $V_{OUT}$ can then be used to drive a load.

In some embodiments, the PWM signal is coupled to the driver circuits DRV1 and DRV2 to drive the respective power switches M1 and M2. In some examples, the PWM signal is inverted at one of the driver circuits, such as driver circuit DRV2 for driving the lower power switch M2. In this manner, the upper power switch M1 and the lower power switch M2 are turned on and off alternately by the PWM signal. In the embodiment shown in FIG. 6, the controller 120 generates a pair of PWM signals PWM1, PWM2 coupled to driver circuits DRV1, DRV2, respectively, for driving the upper power switch M1 and lower power switch M2, respectively.

In embodiments of the present invention, the controller 120 in the switching regulator 100 implements power recycling. To that end, the controller 120 includes a buck control circuit 122 which operates in the main operating mode to step down the input voltage $V_{IN}$ to generate a regulated output voltage $V_{OUT}$ having a voltage value indicated by the target voltage $V_{TARG}$. To support power recycling, the controller 120 further includes a boost control circuit 124 which operates in response to the decay command to recycle charge from the output voltage node 108. In the present embodiment, a selector 128 may be used to select between the buck and boost control circuits. The selector 128 may be controlled by a recycle select signal to select the PWM signals generated by either the buck control circuit 122 during main operation mode or the boost control circuit 124 during the recycle operation mode. In one example, the recycle select signal is related to the decay command and is asserted to select the boost control circuit 124 in response to receiving the decay command from the host. The recycled charge returned to the input voltage node 102 does not change the input voltage $V_{IN}$ but adds to the stored energy, such as when the input voltage source is a battery power source.

The switching regulator 100 implements a feedback control loop to regulate the output voltage $V_{OUT}$. In the present embodiment, the controller 120 receives a feedback voltage $V_{FB}$ indicative of the regulated output voltage $V_{OUT}$ either at the output node 108 or at the load. In some examples, the feedback voltage $V_{FB}$ is a stepped down voltage of the output voltage $V_{OUT}$. For example, the feedback voltage $V_{FB}$ may be generated by a voltage divider (not shown). The controller 120 also receives a reference voltage or target voltage $V_{TARG}$ indicative of the voltage value desired for the regulated output voltage. In the present embodiment, the controller 120 further receives a current sense signal CS as a feedback signal. The current sense signal CS is indicative of the current flowing in the power stage, for example, the current flowing through the lower power switch M2. In one embodiment, the buck control circuit 122 operates in a feedback control loop using the feedback voltage $V_{FB}$. Meanwhile, the boost control circuit 124 operates in a feedback control loop using the current sense signal CS to regulate the current level to control the charge recycling.

In embodiments of the present invention, the controller 120 further includes a status memory 126 for storing a status indicator as well as the expected state or operation mode the switching regulator should exit to after the output voltage has discharged or decayed. The status memory 126 supports the reporting and control functions of the switching regulator 100. The status memory 126 stores a decay status indicator when a decay command is received and while the controller 120 is performing charge recycling. In this manner, the switching regulator 100 can report a decay status to external host system even while the controller 120 is actually performing charge recycling, instead of decaying or ramping down the output voltage. When the charge recycling operation is completed, the status memory 126 clears the decay status indicator and the controller 120 reports the expected operation mode after the decay period where the expected operation mode was stored in the status memory 126.

As thus configured, the controller 120 includes a buck control circuit 122 for the main operation mode of stepping down the input voltage to generate an output voltage and a boost control circuit 124 for the power recycling operation mode to recycle stored charge at the output voltage node back to the input voltage node. The switching regulator 100 of the present invention including the buck control circuit and the boost control circuit is distinguished from a traditional buck-boost switching regulator. In particular, a traditional buck-boost switching regulator regulates the output voltage by regulating the PWM signal at both the up-ramp and the down-ramp. That is, the traditional buck-boost switching regulator regulates the output voltage when the current is flowing from the input voltage node to the output voltage node and when the current is flowing from the output voltage node back to the input voltage node.

To the contrary, the switching regulator 100 includes a controller that regulates the output voltage separately for current flowing out to the output voltage node and current flowing in from the output voltage node. More specifically, in some embodiments, the buck control circuit 122 of the controller 120 controls the up-ramp of the PWM signal which regulates the output voltage as the current is flowing out from the input voltage node to the output voltage node. Meanwhile, the boost control circuit 124 of the controller 120 controls the down-ramp of the PWM signal which regulates the output voltage as the current is flowing in from the output voltage node to the input voltage node. In this manner, the controller 120 controls the delivery of the stored charge from the output voltage node 108, such as the stored charge on the output capacitor $C_{OUT}$, to the input voltage node 102. The boost control circuit 124 generates the PWM signal to control the rate of charge delivery from the output voltage node to the input voltage node so that the charge is recycled in a controlled manner to the input voltage node. In other words, the rate of charge recycling or returning is controlled by the boost control circuit 124.

Figure 7A:
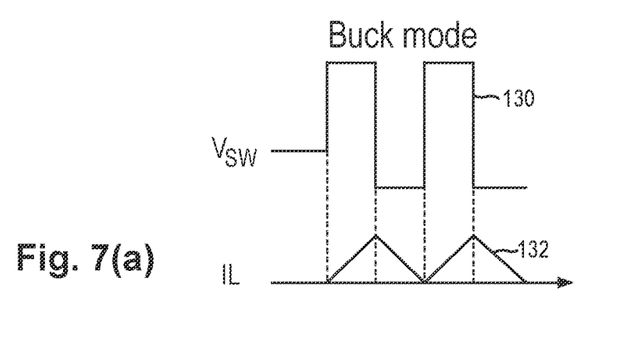
FIGS. 7(a) and 7(b) illustrates signal waveforms for the switching output voltage and the inductor current for the buck mode and the boost mode in embodiments of the present invention.
Figure 7B:
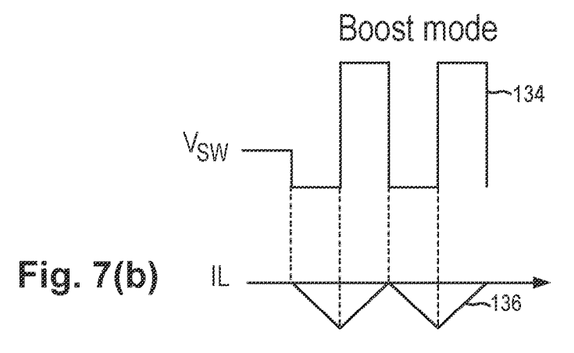

The operation of the controller 120 in the buck mode and the boost mode is further explained with reference to FIGS. 7(a) and 7(b). FIGS. 7(a) and 7(b) illustrates signal waveforms for the switching output voltage and the inductor current for the buck mode and the boost mode in embodiments of the present invention. Referring to FIG. 6 and FIGS. 7(a) and 7(b), the PWM signal generated by the buck control circuit or the boost control circuit is a sawtooth signal waveform including an up-ramp portion and a down-ramp portion. The up-ramp portion turns on the upper power switch M1 and turns off the lower power switch M2. The down-ramp portion turns on the lower power switch M2 and turns off the upper power switch M1. During the up-ramp portion of the PWM signal, the upper power switch is turned on and the switching output voltage $V_{SW}$ (node 104) is driven to the input voltage $V_{IN}$. During the down-ramp portion of the PWM signal, the lower power switch is turned on and the switching output voltage $V_{SW}$ is driven to the ground voltage.

FIG. 7(a) illustrates the buck mode operation. In buck mode operation, the buck control circuit 122 regulates the up-ramp portion of the PWM signal which connects the switching output voltage $V_{SW}$ (curve 130) to the input voltage $V_{IN}$ and ramps up the inductor current IL (curve 132) from the input voltage node to the inductor. The inductor current IL stores charges in the inductor L1. During the down-ramp portion of the PWM signal, the switching output voltage $V_{SW}$ switches to the ground voltage and the inductor current IL ramps down, delivering the charge to the output capacitor $C_{OUT}$ to maintain the regulated output voltage.

FIG. 7(b) illustrates the boost mode operation. In boost mode operation, the boost control circuit 124 regulates the down-ramp portion of the PWM signal which connects the switching output voltage $V_{SW}$ (curve 134) to the ground voltage and ramps up the inductor current IL (curve 136) from the output voltage node to the inductor. The negative inductor current IL removes charges from the output capacitor $C_{OUT}$ and stores the charge in the inductor L1. During the up-ramp portion of the PWM signal, the switching output voltage $V_{SW}$ switches to the input voltage $V_{IN}$ and the inductor current IL ramps down, delivering the charge to the input voltage node 102 to recycle the stored charge that was on the output voltage node 108.

Figure 8:
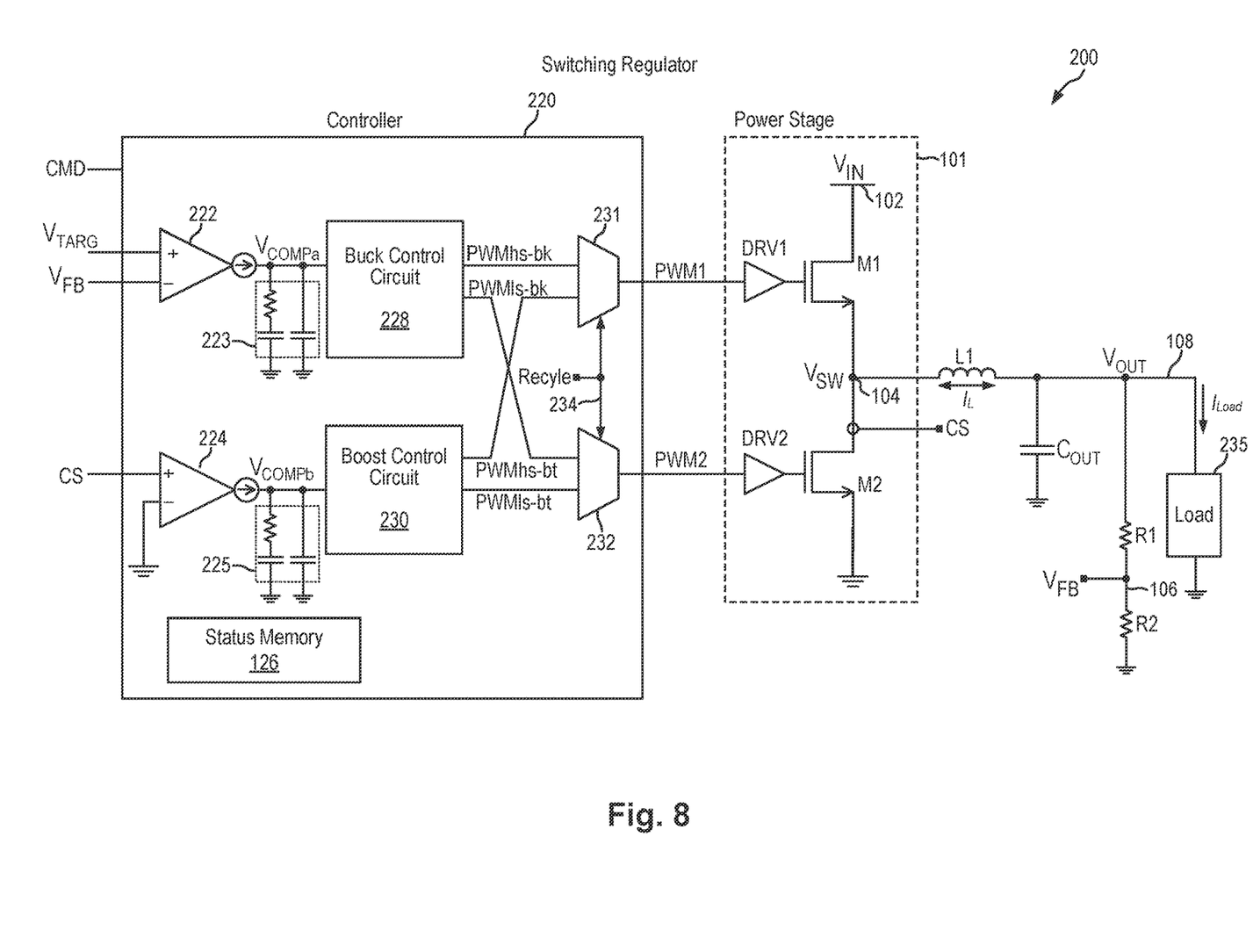
FIG. 8 is a schematic diagram of a switching regulator incorporating power recycling in alternate embodiments of the present invention.

FIG. 8 is a schematic diagram of a switching regulator incorporating power recycling in alternate embodiments of the present invention. In particular, FIG. 8 illustrates the detailed construction of the controller in the switching regulator of FIG. 6. Like elements in FIGS. 6 and 8 are given like reference numerals and will not be further discussed. Referring to FIG. 8, a switching regulator 200 includes a controller 220 implement power recycling. The controller 220 includes a buck control circuit 228 to implement the main operation mode of stepping down or bucking the input voltage $V_{IN}$ to generate the regulated output voltage $V_{OUT}$ having a voltage value indicated by the reference voltage $V_{TARG}$. The controller 220 further includes a boost control circuit 230 to implement the power recycle mode of recycling charge at the output voltage node 108 back to the input voltage node 102 in the event the output voltage $V_{OUT}$ is to be ramped down in response to a decay command.

In the present embodiment, the buck control circuit 228 operates under a voltage feedback control scheme. To that end, the feedback voltage $V_{FB}$, such as generated from a voltage divider of resistors R1 and R2, is fed back to the controller 220. The controller 220 includes an error amplifier 222 to receive the feedback voltage $V_{FB}$ and the reference voltage $V_{TARG}$. The error amplifier 222 compares the feedback voltage $V_{FB}$ to the reference voltage $V_{TARG}$ to generate a control loop error signal $V_{COMPa}$. The error signal $V_{COMPa}$ can be a voltage signal or a current signal. For example, the error amplifier 222 generates an output current which can be converted to a voltage signal by a loop filter 223 coupled to the output of the error amplifier 222. The error signal $V_{COMPa}$ is provided to the buck control circuit 228 which generates the PWM signal for controlling the power stage 101 in the buck mode to step down the input voltage $V_{IN}$ to the regulated output voltage $V_{OUT}$. In the present embodiment, the buck control circuit 228 generates a PWM signal PWMhs-bk for the upper power switch M1 and a PWM signal PWMls-bk for the lower power switch M2. In some embodiments, the PWM signal PWMhs-bk is inverse of PWM signal PWMls-bk.

In the present embodiment, the boost control circuit 230 operates under a current feedback control scheme. To that end, a current sense signal CS, such as generated from sensing the current at the switching output node $V_{SW}$ 104 or at the lower power switch M2, is fed back to the controller 220. The controller 220 includes an error amplifier 224 to receive the current sense signal CS and compares the current sense signal CS to a reference voltage, such as ground voltage, to generate a control loop error signal $V_{COMPb}$. The error signal $V_{COMPb}$ can be a voltage signal or a current signal. For example, the error amplifier 224 generates an output current which can be converted to a voltage signal by a loop filter 225 coupled to the output of the error amplifier 224. The error signal $V_{COMPb}$ is provided to the boost control circuit 230 which generates the PWM signal for controlling the power stage 101 in the boost mode to recycle charges from the output voltage node 108 to the input voltage node 102. In the present embodiment, the boost control circuit 230 generates a PWM signal PWMhs-bt for the upper power switch M1 and a PWM signal PWMls-bt for the lower power switch M2. In some embodiments, the PWM signal PWMhs-bt is inverse of PWM signal PWMls-bt.

In the present description, the boost control circuit 230 operates under a current feedback control scheme. In other embodiments, the boost control circuit 230 can operate under a voltage feedback control scheme or a combination of current and voltage feedback control scheme. The specific feedback control scheme used by the boost control circuit 230 is not critical to the practice of the present invention.

In the present embodiment, the controller 220 includes multiplexers 230 and 232 to select the PWM signals from either the buck control circuit 228 or the boost control circuit 230. The multiplexer 231 selects between the PWM signals PWMhs-bk and PWMhs-bt as the PWM signal PWM1 for driving the upper power switch M1. The multiplexer 232 selects between the PWM signals PWM1s-bk and PWM1s-bt as the PWM signal PWM2 for driving the lower power switch M2. A recycle select signal (node 234) is used to select the respective PWM signals. For example, the recycle select signal has a first logical state for selecting the PWM signals generated by the buck control circuit 228 and a second logical state for selecting the PWM signals generated by the boost control circuit 230. In one embodiment, the recycle select signal is related to the decay command and has the first logical state when the decay command is not being received and has the second logical state starting when the decay command is received and lasting until the recycled operation is complete.

As thus configured, the switching regulator 200 includes the controller 220 implementing charge recycling. In normal operation, the switching regulator 200 activates the buck control circuit to generate the regulated output voltage from the input voltage to supply a load 235. When the switching regulator 200 receives the decay command, the controller 220 activates the boost control circuit 230 to operate the power switches in the boost mode to recycle or return charges that are stored at the output voltage node 108, such as on the output capacitor $C_{OUT}$, to the input voltage node 102. As the stored charge is being returned to the input voltage node 102, the output voltage $V_{OUT}$ is driven to a predetermined voltage level specified by the decay command, such as to 0V or a voltage value other than 0V.

In alternate embodiments of the present invention, the switching regulator operates normally in the boost mode using the boost control circuit to generate the regulated output voltage having a first voltage value greater than the input voltage. In that case, the controller activates the buck control circuit to return charges stored on the output capacitor at the output node to the input node, thereby driving the regulated output voltage to a second voltage value lower than the first voltage value. More specifically, the controller operates in the boost mode using the boost control circuit in normal operation to generate the regulated output voltage. In response to a command instructing the controller to allow the output voltage to decay, the controller operates in the buck mode using the buck control circuit to recycle the stored charge at the output node while allowing the output voltage to ramp down more rapidly due to the active relocation of the stored charge. Meanwhile, the switching regulator includes a status memory to enable the switching regulator to report the decay status while it is performing charge recycling and exit to the expected operation mode after the charge recycling operation is completed.

In other embodiments of the present invention, the switching regulator operates in an operation mode different from the operation mode commanded by incoming commands. The switching regulator stores the intended commands in a memory and uses the memory to track and respond to inquiries or requests based on the intended commands even while the switching regulator is performing other operations.

The invention can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the invention may take, may be referred to as techniques. In general, the order of the steps of disclosed processes may be altered within the scope of the invention.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

The invention claimed is:

1. A controller for a switching regulator, the switching regulator configured to receive an input voltage and to generate a regulated output voltage on an output node for driving a load, the controller comprising:
   a buck control circuit configured to receive a first error signal indicative of a difference between a feedback voltage indicative of the regulated output voltage and a reference voltage, the buck control circuit configured to generate a first pulse width modulation (PWM) signal for driving a power stage, the power stage receiving the input voltage on an input node and delivering a first phase current through an inductor to the output node to which an output capacitor and a load are connected, the buck control circuit generating the first PWM signal to drive the regulated output voltage to a first voltage value lower than the input voltage; and
   a boost control circuit configured to receive a second error signal indicative of at least a current sense signal relating to the current flowing in the power stage, the boost control circuit configured to generate a second pulse width modulation (PWM) signal to drive the power stage to cause a second phase current to flow from the output node to the input node to return charges stored on the output capacitor to the input node, thereby decreasing the regulated output voltage to a second voltage value lower than the first voltage value,
   wherein in response to a first command, the buck control circuit is activated to generate the first PWM signal to drive the power stage to generate the regulated output voltage having the first voltage value; and in response to a second command, the boost control circuit is activated to generate the second PWM signal to drive the power stage to return charges stored at the output node on the output capacitor to the input node and to decrease the regulated output voltage at the output node to the second voltage value; and
   wherein the second command comprises a decay command to instruct the controller to ramp down the regulated output voltage to the second voltage value, and in response to the second command, the controller activates the boost control circuit to return the charges stored on the output capacitor to the input node while driving the regulated output voltage to the second voltage value; and during a charge recycle period when the boost control circuit is activated to return the stored charges from the output capacitor, the controller responds to incoming commands or requests by providing a status indicator that the switching regulator is in a decay state even though the switching regulator is performing charge recycling.

2. The controller of claim 1, further comprises:
   a first error amplifier configured to receive the feedback voltage indicative of the regulated output voltage and the reference voltage, and to generate the first error signal indicative of the difference between the feedback voltage and the reference voltage; and
   a second error amplifier configured to receive the current sense signal indicative of the current flowing in the power stage, and to generate the second error signal indicative of the current sense signal.

3. The controller of claim 1, wherein the controller comprises a multi-phase controller, each of the buck control circuit and the boost control circuit generating a plurality of pulse width modulation (PWM) signals for driving a plurality of power stages in a plurality of phases, each power stage receiving the input voltage and delivering a phase current through a respective inductor to the output node to which the output capacitor and the load are connected, the plurality of PWM signals being generating in response to the respective error signal.

4. The controller of claim 1, wherein each of the first and second PWM signals comprises an up-ramp portion and a down-ramp portion, and wherein:
   the buck control circuit is configured to generate the first PWM signal to regulate the up-ramp portion of the first PWM signal to cause the first phase current to flow from the input node to the output node to store energy in the inductor, the buck control circuit generating the down-ramp portion of the first PWM signal to deliver the stored energy in the inductor to the output capacitor to regulate the output node to the first voltage value; and
   the boost control circuit is configured to generate the second PWM signal to regulate the down-ramp portion of the second PWM signal to cause the second phase current to flow from the output node to the input node to deliver the stored charges in the output capacitor to the inductor, the boost control circuit generating the up-ramp portion of the second PWM signal to deliver the stored energy in the inductor to the input node, thereby returning the stored charge in the output capacitor to the input node and driving the output node to the second voltage value.

5. The controller of claim 4, wherein the power stage comprises an upper power switch and a lower power switch connected in series between the input node and a ground potential, the upper and lower power switches being controlled by the respective first or second PWM signal to alternately turn on and off to generate a switching output voltage at a switching output node, the inductor between connected between the switching output node and the output node, the up-ramp portion of the PWM signal turns on the upper power switch and the down-ramp portion of the PWM signal turns on the lower power switch.

6. The controller of claim 5, wherein the buck control circuit generates the first PWM signal to turn on the upper power switch to cause the first phase current to flow from the input voltage to the inductor and to turn on the lower power switch to deliver the stored energy in the inductor to the output capacitor, thereby generating the regulated output voltage having the first voltage value; and wherein the boost control circuit generates the second PWM signal to turn on the lower power switch to cause the second phase current to flow from the output voltage to the inductor and to turn on the upper power switch to deliver the stored energy in the inductor to the input node, thereby returning the stored charge in the output capacitor to the input node.

7. The controller of claim 1, wherein in response to the stored charges being returned to the input node and the output voltage being driven to the second voltage value, the boost control circuit is deactivated and the controller operates the switching regulator in a predetermined operation mode.

8. The controller of claim 7, wherein during the charge recycle period, the controller receives a first command indicating an expected operation mode to use after the decay state and the controller stores the first command in a memory; and after the charge recycle period has completed, the controller operates the switching regulator in the expected operation mode according to the first command stored in the memory.

9. The controller of claim 1, wherein during a charge recycle period when the boost control circuit is activated to return the stored charges from the output capacitor, the controller receives incoming commands and responds to the incoming commands as if the switching regulator is in a decay state even though the switching regulator is performing charge recycling.

10. The controller of claim 9, wherein the controller stores incoming commands received during the charge recycle period in a memory; and after the charge recycle period has completed, the controller operates the switching regulator according to the commands stored in the memory.

11. The controller of claim 1, wherein the second voltage value comprises 0V or a voltage value less than the first voltage value.

12. The controller of claim 1, wherein the boost control circuit generates the second PWM signal to control a rate of charge delivery from the output node to the input node.

13. A method in a controller for a switching regulator, the switching regulator configured to receive an input voltage on an input node and to generate a regulated output voltage on an output node for driving a load, the method comprising:

receiving a first command to set the regulated output voltage to a first voltage value less than the input voltage;

configuring the controller to operate in a buck mode to generate a first pulse width modulation (PWM) signal in response to a first error signal for driving a power stage to regulate the output voltage on the output node to the first voltage value, the first error signal being indicative of a difference between a feedback voltage indicative of the regulated output voltage and a reference voltage;

receiving a second command to ramp down the voltage at the output node to a second voltage value less than the first voltage value, the second command comprising a decay command to instruct the controller to ramp down the regulated output voltage to the second voltage value;

configuring the controller to operate in a boost mode to generate a second pulse width modulation (PWM) signal in response to a second error signal for driving the power stage to return stored charges on the output node to the input node while decreasing the voltage at the output node to the second voltage value, the second error signal being indicative of at least a current sense signal relating to the current flowing in the power stage; and in response to receiving the second command and during a charge recycle period where the controller is configured to operate in the boost mode to return stored charges to the input node, responding to incoming commands or requests by providing a status indicator that the switching regulator is in a decay state.

14. The method of claim 13, wherein configuring the controller to operate in the buck mode to generate a first pulse width modulation (PWM) signal in response to a first error signal for driving a power stage to regulate the output voltage on the output node to the first voltage value comprises:

generating the first pulse width modulation (PWM) signal for driving the power stage to generate the regulated output voltage having the first voltage value, the power stage receiving the input voltage on the input node and delivering a first phase current through an inductor to the output node to which an output capacitor and a load are connected.

15. The method of claim 14, wherein configuring the controller to operate in the boost mode to generate a second pulse width modulation (PWM) signal in response to a second error signal for driving the power stage to return stored charges on the output node to the input node while decreasing the voltage at the output node to the second voltage value comprises:

generating the second pulse width modulation (PWM) signal to drive the power stage to cause a second phase current to flow from the output node to the input node to return charges stored on the output capacitor to the input node, thereby decreasing the voltage at the output node to the second voltage value.

16. The method of claim 15, wherein the controller comprises a multi-phase controller and generating the first or second PWM signal each comprises generating a plurality of pulse width modulation (PWM) signals for driving a plurality of power stages in a plurality of phases, each power stage receiving the input voltage and delivering a phase current through a respective inductor to the output node to which the output capacitor and the load are connected, the plurality of PWM signals being generating in response to the respective error signal.

17. The method of claim 15, wherein each of the first and second PWM signals comprises an up-ramp portion and a down-ramp portion and wherein:
generating the first PWM signal for driving the power stage comprises regulating the up-ramp portion of the first PWM signal to cause the first phase current to flow from the input node to the output node to store energy in the inductor and generating the down-ramp portion of the first PWM signal to deliver the stored energy in the inductor to the output capacitor to regulate the output node to the first voltage value; and
generating the second PWM signal to drive the power stage comprises regulating the down-ramp portion of the second PWM signal to cause the second phase current to flow from the output node to the input node to deliver the stored charges in the output capacitor to the inductor and generating the up-ramp portion of the second PWM signal to deliver the stored energy in the inductor to the input node, there by returning the stored charge in the output capacitor to the input node and driving the output node to the second voltage value.

18. The method of claim 15, wherein generating the second PWM signal comprises:
generating the second PWM signal to control a rate of charge delivery from the output node to the input node.

19. The method of claim 13, further comprising:
in response to receiving the second command, storing in a status memory a status indicator indicating the switching regulator is in the decay state; and
responding to incoming commands or requests during the charge recycle period using the status indicator stored in the status memory.

20. The method of claim 19, further comprising:
in response to the stored energy being returned to the input node and the output voltage being driven to the second voltage value, clearing the status indicator in the status memory and configuring the controller to operate in a predetermined operation mode.

21. The method of claim 20, further comprising:
in response to receiving a first command indicating an expected operation mode to use after the decay state, storing the first command in the status memory; and
after the charge recycle period has completed, operating the switching regulator in the expected operation mode according to the first command stored in the memory.

22. The method of claim 13, further comprising:
during the charge recycle period, receiving incoming commands and responding to the incoming commands as if the switching regulator is in a decay state even though the switching regulator is performing charge recycling.

23. The method of claim 22, further comprising:
storing incoming commands received during the charge recycle period in a memory; and
after the charge recycle period has completed, operating the switching regulator according to the commands stored in the memory.

24. The method of claim 13, wherein the second voltage value comprises 0V or a voltage value less than the first voltage value.

25. A controller for a switching regulator, the switching regulator configured to receive an input voltage and to generate a regulated output voltage on an output node for driving a load, the controller comprising:
a buck control circuit configured to receive a first error signal indicative of a difference between a feedback voltage indicative of the regulated output voltage and a reference voltage, the buck control circuit configured to generate a first pulse width modulation (PWM) signal for driving a power stage, the power stage receiving the input voltage on an input node and delivering a first phase current through an inductor to the output node to which an output capacitor and a load are connected, the buck control circuit generating the first PWM signal to drive the regulated output voltage to a first voltage value lower than the input voltage; and
a boost control circuit configured to receive a second error signal indicative of at least a current sense signal relating to the current flowing in the power stage, the boost control circuit configured to generate a second pulse width modulation (PWM) signal to drive the power stage to cause a second phase current to flow from the output node to the input node to return charges stored on the output capacitor to the input node, thereby decreasing the regulated output voltage to a second voltage value lower than the first voltage value,
wherein in response to a first command, the buck control circuit is activated to generate the first PWM signal to drive the power stage to generate the regulated output voltage having the first voltage value; and in response to a second command, the boost control circuit is activated to generate the second PWM signal to drive the power stage to return charges stored at the output node on the output capacitor to the input node and to decrease the regulated output voltage at the output node to the second voltage value; and
wherein the second command comprises a decay command to instruct the controller to ramp down the regulated output voltage to the second voltage value, and in response to the second command, the controller activates the boost control circuit to return the charges stored on the output capacitor to the input node while driving the regulated output voltage to the second voltage value; and during a charge recycle period when the boost control circuit is activated to return the stored charges from the output capacitor, the controller receives incoming commands and responds to the incoming commands as if the switching regulator is in a decay state even though the switching regulator is performing charge recycling.

26. The controller of claim 25, wherein the controller stores incoming commands received during the charge recycle period in a memory; and after the charge recycle period has completed, the controller operates the switching regulator according to the commands stored in the memory.

27. The controller of claim 25, wherein during a charge recycle period when the boost control circuit is activated to return the stored charges from the output capacitor, the controller responds to incoming commands or requests by providing a status indicator that the switching regulator is in a decay state even though the switching regulator is performing charge recycling.

* * * * *